US011935527B2

(12) United States Patent
Sharifi et al.

(10) Patent No.: US 11,935,527 B2
(45) Date of Patent: Mar. 19, 2024

(54) ADAPTING AUTOMATED ASSISTANT FUNCTIONALITY BASED ON GENERATED PROFICIENCY MEASURE(S)

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 601 days.

(21) Appl. No.: 17/078,779

(22) Filed: Oct. 23, 2020

(65) Prior Publication Data

US 2022/0130379 A1 Apr. 28, 2022

(51) Int. Cl.
*G10L 21/00* (2013.01)
*G06F 16/9032* (2019.01)
(Continued)

(52) U.S. Cl.
CPC ........ *G10L 15/22* (2013.01); *G06F 16/90332* (2019.01); *G06F 16/9035* (2019.01);
(Continued)

(58) Field of Classification Search
CPC ............. G06F 16/903; G06F 16/90332; G06F 16/9032; G06F 16/90324; G06F 16/9035;
(Continued)

(56) References Cited

U.S. PATENT DOCUMENTS

| 2015/0121216 A1* | 4/2015 | Brown .................. G06N 3/008 715/705 |
| 2015/0185996 A1 | 7/2015 | Brown et al. |

(Continued)

FOREIGN PATENT DOCUMENTS

| JP | 2016071050 | 5/2016 |
| KR | 20160147303 | 12/2016 |

(Continued)

OTHER PUBLICATIONS

European Patent Office; International Search Report and Written Opinion of App. No. PCT/US2020/064986; 14 pages; dated Jul. 14, 2021.

(Continued)

*Primary Examiner* — Michael Ortiz-Sanchez
(74) *Attorney, Agent, or Firm* — Gray Ice Higdon

(57) ABSTRACT

Implementations relate to generating a proficiency measure, and utilizing the proficiency measure to adapt one or more automated assistant functionalities. The generated proficiency measure is for a particular class of automated assistant actions, and is specific to an assistant device and/or is specific to a particular user. A generated proficiency measure for a class can reflect a degree of proficiency, of a user and/or of an assistant device, for that class. Various automated assistant functionalities can be adapted, for a particular class, responsive to determining the proficiency measure satisfies a threshold, or fails to satisfy the threshold (or an alternate threshold). The adaptation(s) can make automated assistant processing more efficient and/or improve (e.g., shorten the duration of) user-assistant interaction(s).

15 Claims, 4 Drawing Sheets

(51) Int. Cl.
   *G06F 16/9035* (2019.01)
   *G06F 21/12* (2013.01)
   *G10L 15/22* (2006.01)
   *G10L 15/26* (2006.01)
   *G10L 25/00* (2013.01)
   *G06F 3/04812* (2022.01)

(52) U.S. Cl.
   CPC ............ *G06F 21/121* (2013.01); *G10L 15/26* (2013.01); *G06F 3/04812* (2013.01)

(58) Field of Classification Search
   CPC ............. G06F 16/90335; G06F 16/906; G06F 3/04812; G06F 3/167; G06F 3/16; G06F 3/162; G06F 16/245; G06F 16/24; G06F 16/00; G06F 16/907; G06F 3/01; G06F 3/048; G06F 3/00; G06F 21/30; G06F 21/106; G06F 21/121; G10L 15/26; G10L 2015/223; G10L 15/22; G10L 15/01; G10L 17/22; G10L 17/02; G10L 2015/225; G10L 2015/227; G10L 2015/226; G10L 2015/228; G10L 99/00; G10L 25/48; H04L 65/1101; G09B 7/00; G09B 17/00
   See application file for complete search history.

(56) References Cited

U.S. PATENT DOCUMENTS

| | | |
|---|---|---|
| 2016/0092160 A1 | 3/2016 | Graff et al. |
| 2017/0358302 A1 | 12/2017 | Orr et al. |
| 2018/0032884 A1 | 2/2018 | Murugeshan |
| 2018/0314689 A1 | 11/2018 | Wang et al. |
| 2018/0330731 A1* | 11/2018 | Zeitlin ................ G10L 15/1815 |
| 2018/0336275 A1 | 11/2018 | Graham et al. |
| 2019/0371329 A1 | 12/2019 | D'Souza et al. |
| 2020/0380973 A1* | 12/2020 | Novitchenko .......... G06F 40/35 |

FOREIGN PATENT DOCUMENTS

| | | | |
|---|---|---|---|
| WO | 2020180286 | 9/2020 | |
| WO | WO-2020226665 A1 * | 11/2020 | ............. G01D 21/02 |

OTHER PUBLICATIONS

Intelectual Property India; Examination Report issued in Application No. 202227062333; 8 pages; dated Sep. 26, 2023.

European Patent Office; Communication pursuant to Article 94(3) EPC issued in Application No. 20829154.2; 7 pages; dated Dec. 4, 2023.

* cited by examiner

ADAPTING AUTOMATED ASSISTANT FUNCTIONALITY BASED ON GENERATED PROFICIENCY MEASURE(S)

BACKGROUND

Humans can engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands/requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

SUMMARY

Implementations disclosed herein relate to generating a proficiency measure, and utilizing the proficiency measure to adapt one or more automated assistant functionalities. The generated proficiency measure is for a particular class of automated assistant actions, and is specific to an assistant device (a client device having an automated assistant interface) and/or is specific to a particular user. As one example, a generated proficiency measure can be for a class of smart device automated assistant control actions and for a particular assistant device (i.e., a singular assistant device of an ecosystem of assistant devices in a household or other environment). As another example, a generated proficiency measure can be for a class of music control automated assistant actions and can be for a particular user (i.e., a singular user account that can be linked with one or more assistant devices in an ecosystem). As yet another example, a generated proficiency measure can be for a class of communications actions and can be for a particular user and for a particular user device (i.e., a singular user for a singular assistant device).

Proficiency measures can be generated for additional and/or alternative classes of automated assistant actions, including those that are more granular and/or less granular than the aforementioned classes. For example, a corresponding proficiency measure can be generated for a genus class of smart device automated assistant control actions and/or for species class(es) of that genus class, such as a class of smart lighting automated assistant actions, a class of smart thermostat automated assistant actions, and/or a class of smart camera automated assistant actions. A class of automated assistant action(s) can be defined with various levels of granularity and can be defined by the automated assistant intent(s) that are associated with the class. Put another way, each class can have a unique set of automated assistant intents associated therewith, although some intent(s) of a class may also be associated with additional class(es).

A generated proficiency measure for a class can reflect a degree of proficiency, of a user and/or of an assistant device, for that class. As described in detail herein, various automated assistant functionalities can be adapted, for a particular class, responsive to determining the proficiency measure satisfies a threshold, or fails to satisfy the threshold (or an alternate threshold). As also described herein, one or more of these adaptation(s) can make automated assistant processing more efficient and/or improve (e.g., shorten the duration of) user-assistant interaction(s). Further, the adaptation(s) tailor automated assistant processing and/or interactions on a class-by-class basis, and a device-by-device and/or a user-by-user basis—and do so by automatically determining adaptation(s) that will result in technical benefit(s) based on an objectively determined proficiency measures that are each specific to a corresponding class, and specific to a corresponding assistant device and/or user.

The above is provided merely as an overview of some implementations. Those and/or other implementations are disclosed in more detail herein.

DETAILED DESCRIPTION

Figure 1:
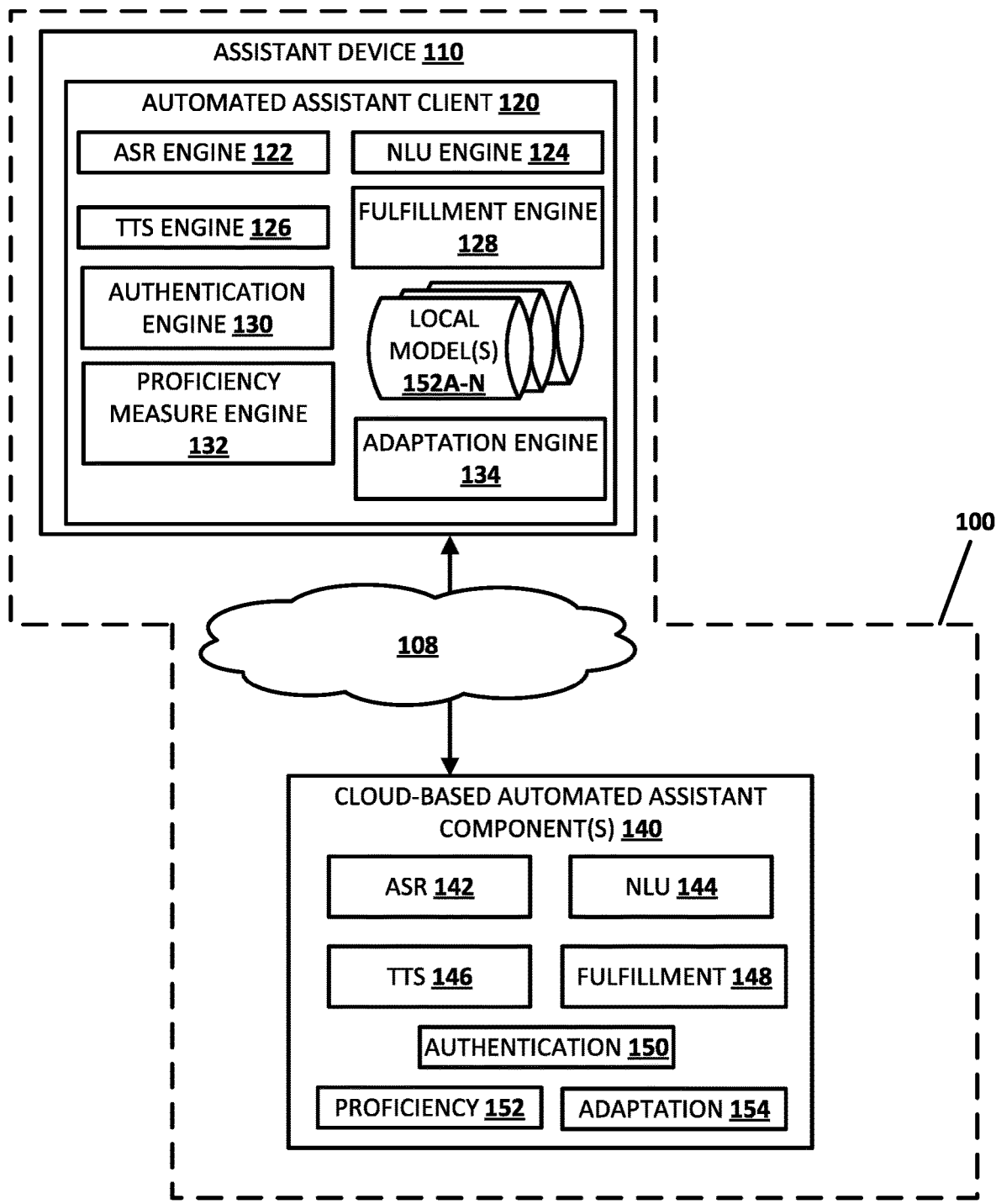
FIG. 1 is a block diagram of an example computing environment in which implementations disclosed herein may be implemented.

Turning initially to FIG. 1, an example environment is illustrated in which various implementations can be performed. FIG. 1 includes an assistant device 110 (i.e., a client device executing an automated assistant client and/or via which an automated assistant is otherwise accessible), which executes an instance of an automated assistant client 120. One or more cloud-based automated assistant components 140 can be implemented on one or more computing systems (collectively referred to as a "cloud" computing system) that are communicatively coupled to assistant device 110 via one or more local and/or wide area networks (e.g., the Internet) indicated generally at 108.

An instance of an automated assistant client 120, optionally via interaction(s) with one or more of the cloud-based automated assistant components 140, can form what appears to be, from the user's perspective, a logical instance of an automated assistant with which the user may engage in a human-to-computer dialog. An instance of such an automated assistant 100 is depicted in FIG. 1.

The assistant device 110 can be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device).

Assistant device 110 can be utilized by one or more users within a household, a business, or other environment. Further, one or more users may be registered with the assistant device 110 and have a corresponding user account accessible via the assistant device 110. One or more authentication technique(s) can be utilized to verify which registered user is interacting with the assistant device 110 or, if only a single user is registered for the assistant device 110, whether it is the registered user interactive with the assistant device 110. As one example, text-dependent speaker verification(s) (TD-SV(s)) can be generated and stored for each of the registered users (e.g., in association with their corresponding user profiles), with permission from the associated user(s). TD-SV techniques can be utilized to authenticate an utterance as being from a particular user (instead of from another registered user or a guest user). As other examples, text-independent speaker verification (TI-SV) techniques, speaker verification techniques, facial verification techniques, and/or other verification technique(s) (e.g., PIN entry) can additionally or alternatively be utilized in authenticating a particular user.

Additional and/or alternative assistant devices may be provided and, in some of those implementations, one or more users can each be registered with (or otherwise linked to) and verifiable at each of those additional or alternative assistant devices. In various implementations, the assistant device 110 may optionally operate one or more other applications that are in addition to automated assistant client 104, such as a message exchange client (e.g., SMS, MMS, online chat), a browser, and so forth. In some of those various implementations, one or more of the other applications can optionally interface (e.g., via an application programming interface) with the automated assistant 100, or include their own instance of an automated assistant application (that may also interface with the cloud-based automated assistant component(s) 140).

Automated assistant 100 engages in human-to-computer dialog sessions with a user via user interface input and output devices of the client device 110. To preserve user privacy and/or to conserve resources, in many situations a user must often explicitly invoke the automated assistant 100 before the automated assistant will fully process a spoken utterance. The explicit invocation of the automated assistant 100 can occur in response to certain user interface input received at the assistant device 110. For example, user interface inputs that can invoke the automated assistant 100 via the assistant device 110 can optionally include actuations of a hardware and/or virtual button of the assistant device 110. Moreover, the automated assistant client can include one or more local engines, such as an invocation engine that is operable to detect the presence of one or more spoken general invocation wakewords. The invocation engine can invoke the automated assistant 100 in response to detection of one of the spoken invocation wakewords. For example, the invocation engine can invoke the automated assistant 100 in response to detecting a spoken invocation wakeword such as "Hey Assistant," "OK Assistant", and/or "Assistant". The invocation engine can continuously process (e.g., if not in an "inactive" mode) a stream of audio data frames that are based on output from one or more microphones of the assistant device 110, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 100. As used herein, "invoking" the automated assistant 100 can include causing one or more previously inactive functions of the automated assistant 100 to be activated. For example, invoking the automated assistant 100 can include causing one or more local engines and/or cloud-based automated assistant components 140 to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant 100.

The automated assistant client 120 in FIG. 1 is illustrated as including an automatic speech recognition (ASR) engine 122, a natural language understanding (NLU) engine 124, a text-to-speech (TTS) engine 126, a fulfillment engine 128, an authentication engine 130, a proficiency measure engine 132, and an adaptation engine 134. In some implementations, one or more of the illustrated engines can be omitted (e.g., instead implemented only by cloud-based automated assistant component(s) 140) and/or additional engines can be provided (e.g., an invocation engine described above).

The ASR engine 122 can process audio data that captures a spoken utterance to generate a recognition of the spoken utterance. For example, the ASR engine 122 can process the audio data utilizing one or more ASR machine learning models to generate a prediction of recognized text that corresponds to the utterance. Those ASR machine learning models can optionally be included amongst the local model(s) 152A-N illustrated in FIG. 1. As described herein (e.g., with respect to FIG. 2A), which local model(s) 152A-N are stored on the assistant device 110 can be dependent on the adaptation(s) that are based on generated proficiency measure(s). For example, certain model(s) can be stored and/or purged based on generated proficiency measure(s). As also described herein (e.g., with respect to FIG. 2A), biasing of ASR performed by the ASR engine 122 can also be dependent on the adaptation(s) that are based on generated proficiency measure(s).

The TTS engine 126 can convert text to synthesized speech, and can rely on one or more speech synthesis neural network models in doing so. The TTS engine 126 can be utilized, for example, to convert a textual response into audio data that includes a synthesized version of the text, and the synthesized version audibly rendered via hardware speaker(s) of the assistant device 110.

The NLU engine 124 determines semantic meaning(s) of audio and/or text converted from audio by the ASR engine, and determines assistant action(s) that correspond to those semantic meaning(s). In some implementations, the NLU engine 124 determines assistant action(s) as intent(s) and/or parameter(s) that are determined based on recognition(s) of the ASR engine 122. In some situations, the NLU engine 124 can resolve the intent(s) and/or parameter(s) based on a single utterance of a user and, in other situations, clarifications or other prompts can be generated based on unresolved intent(s) and/or parameter(s), those prompts rendered to the user, and user response(s) to those prompt(s) utilized by the NLU engine 124 in resolving intent(s) and/or parameter(s). In those situations, the NLU engine 124 can optionally work in concert with a dialog manager engine (not illustrated) that determines unresolved intent(s) and/or parameter(s) and/or generates corresponding prompt(s). The NLU engine 124 can utilize one or more NLU machine learning models in determining intent(s) and/or parameter(s). Those NLU machine learning models can optionally be included amongst the local model(s) 152A-N illustrated in FIG. 1. As described herein (e.g., with respect to FIG. 2A), which NLU local model(s) are stored on the assistant device 110 can be dependent on the adaptation(s) that are based on generated proficiency measure(s). As also described herein (e.g., with respect to FIG. 2A), biasing of NLU performed by the NLU engine 124 can also be dependent on the adaptation(s) that are based on generated proficiency measure(s).

The fulfillment engine 128 can cause performance of assistant action(s) that are determined by the NLU engine 124. For example, if the NLU engine 124 determines an assistant action of "turning on the kitchen lights", the fulfillment engine 128 can cause transmission of corresponding data (directly to the lights or to a remote server associated with a manufacturer of the lights) to cause the "kitchen lights" to be "turned on". As another example, if the NLU engine 124 determines an assistant action of "provide a summary of the user's meetings for today", the fulfillment engine 128 can access the user's calendar, summarize the user's meetings for the day, and cause the summary to be visually and/or audibly rendered at the assistant device 110. The fulfillment engine 128 can optionally utilize one or more machine learning models in performing fulfillment, and such machine learning models can optionally be included amongst the local model(s) 152A-N illustrated in FIG. 1A. As described herein (e.g., with respect to FIG. 2A), which local fulfillment model(s) are stored on the assistant device 110 can be dependent on the adaptation(s) that are based on generated proficiency measure(s).

The authentication engine 130 can determine whether to authenticate a spoken utterance for a particular user that is registered with the assistant device 110. In determining whether to authenticate the spoken utterance, the authentication engine 130 can utilize one or more of the verification techniques described above.

The proficiency measure engine 132 generates proficiency measures that are specific to a class and specific to the assistant device 110 and/or to a particular user of the assistant device 110. The proficiency measure engine 132 can utilize instances of data, that each reflect one or more aspects of a corresponding automated assistant interaction initiated by the assistant device 110 and/or the particular user, in generating such a proficiency measure. The instances of data can be stored locally at the assistant device 110 and/or at cloud-based automated assistant component(s) 140. In some implementations, the proficiency measure engine 132 can perform one or more aspects of blocks 252, 254, and/or 256 of method 200 of FIG. 2A.

The adaptation engine 134 performs one or more adaptations of automated assistant functionality based on the proficiency measure(s) generated by the proficiency measure engine 132. The adaptation engine 134 can optionally also render notifications of such adaptations. In some implementations, the adaptation engine 134 can perform one or more aspects of blocks 258, 260, 264A, 264B, 264C, 264D, 264E, 264F, and/or 264G of method 200 of FIG. 2A.

Cloud-based automated assistant component(s) 140 are optional and can operate in concert with corresponding component(s) of the assistant client 120 and/or can be utilized (always or selectively) in lieu of corresponding component(s) of the assistant client 120. In some implementations, cloud-based component(s) 140 can leverage the virtually limitless resources of the cloud to perform more robust and/or more accurate processing of audio data, and/or other data, relative to any counterparts of the automated assistant client 120. In various implementations, the assistant device 110 can provide audio data and/or other data to the cloud-based automated assistant components 140 in response to an invocation engine detecting a spoken invocation phrase, or detecting some other explicit invocation of the automated assistant 100.

The illustrated cloud-based automated assistant components 140 include a cloud-based ASR engine 142, a cloud-based NLU engine 144, a cloud-based TTS engine 146, a cloud-based fulfillment engine 148, a cloud-based authentication engine 150, a cloud-based proficiency engine 152, and a cloud-based adaptation engine 154. These components can perform similar functionality to their automated assistant client counterparts (if any). In some implementations, one or more of the illustrated cloud-based engines can be omitted (e.g., instead implemented only by automated assistant client 120) and/or additional cloud-based engines can be provided.

FIG. 2 is a flowchart illustrating an example method 200 of generating class proficiency measure(s) and adapting automated assistant functionality based on the generated proficiency measure(s). For convenience, the operations of the flow chart are described with reference to a system that performs the operations. This system may include various components of various computer systems, such as one or more components of automated assistant 100 of FIG. 1. Moreover, while operations of method 200 are shown in a particular order, this is not meant to be limiting. One or more operations may be reordered, omitted or added.

At block 252, the system identifies one or more instances of data from one or more past assistant interactions that are each of a particular class and that are each initiated by a particular user and/or a particular assistant device. For example, the system can identify multiple instances of data that each reflect an associated past assistant interaction that is of a music class. Further, each of the identified past assistant interactions can each be one that was initiated by a particular user and/or by a particular assistant device. As one example, each of the past assistant interactions can each be initiated by a particular user and can collectively include interactions of the particular user via multiple disparate assistant devices. As another example, each of the past assistant interactions can each be initiated by a particular user and can include interactions of the particular user via only a particular assistant device. As yet another example, each of the past assistant interactions can each be initiated by a particular assistant device and can collectively include interactions of multiple users via the particular assistant device. In implementations that identify instance(s) of data for a particular user, the instance(s) of data and the associated past interaction(s) can be associated with the particular user utilizing one or more user verification techniques (e.g., speaker verification, facial verification, and/or other verification technique(s)).

At block 254, the system generates, based on the instance(s) of data, a class proficiency measure that is specific to the particular class and that is specific to the particular user and/or the particular assistant device. Generally, the class proficiency measure reflects a user and/or device specific degree of proficiency for the particular class. In some implementations, the system generates the class proficiency measure based on at least one of the individual metrics described below with respect to block 255A of FIG. 2B. In some of those implementations, the system generates the class proficiency measure as a function of multiple of the individual metrics, as described below with respect to block 255B of FIG. 2B.

At block 256, the system determines whether there are one or more unprocessed classes. If so, the system performs another iteration of blocks 252 and 254 utilizing instance(s) of data from a corresponding one of the unprocessed class(es). Put another way, the system can, in various implementations, generate a corresponding class proficiency measure for each of multiple different classes. Each of the generated class proficiency measures can, in addition to being specific to a corresponding one of the classes, be specific to a particular user and/or a particular assistant device.

After generating class proficiency measure(s), the system can proceed to block 258. At block 258, the system determines, for one or more of the class(es) for which a class proficiency measure has been generated and based on the corresponding class proficiency measure(s), whether to adapt automated assistant functionality/functionalities for the particular user device and/or the particular user. For example, the system can determine to adapt automated assistant functionality or functionalities for any class(es) that have an associated class proficiency measure that satisfies a threshold. For instance, the system can determine to adapt automated assistant functionality or functionalities, for a particular class and for a particular user and/or particular user device, if the associated class proficiency measure for the particular class satisfies a threshold.

At block 260 the system determines whether the determination of block 258 was to adapt the automated assistant functionality or functionalities for one or more classes. If not, the system proceeds to block 262. At block 262, the system can return to block 252 in response to more instance(s) of data becoming available for the particular user and/or the particular device and/or in response to other condition(s). The other condition(s) can be passage of time and/or occurrence of another batch of generating class proficiency measure(s). Put another way, block 262 reflects that the system can generate updated class proficiency measure(s) for the particular user and/or the particular user device. The updated class proficiency measure(s) can be generated at regular or non-regular intervals and optionally only when a threshold quantity of corresponding new instance(s) of data are available and/or when a threshold amount of time has passed since last generating the class proficiency measure(s).

If, at block 260, the system determines that the determination of block 258 was to adapt the automated assistant functionality or functionalities for one or more classes, the system performs one or more of the adaptations of blocks 264A-F and/or other adaptation(s) of the automated assistant functionality or functionalities for one or more classes. When the class proficiency measure is generated for the particular user and the particular device, the adaptation(s) are for the particular device when the particular user interacts with the particular device (e.g., as determined utilizing verification technique(s)). When the class proficiency measure is generated for the particular user only, the adaptation(s) are for the particular user when the particular user interacts with any associated assistant device(s) (e.g., as determined utilizing verification technique(s)). When the class proficiency measure is generated for the particular device only, the adaptation(s) are for the particular device when any user (or at least registered users) interact with the particular device.

In some implementations, how many of the adaptation(s) (e.g., of blocks 264A-F and/or other adaptation(s)) the system performs for a particular class can be contingent on a magnitude of the class proficiency measure for the particular class. For example, if the class proficiency measure has a first value, the system can perform only the adaptations of blocks 264A, 264B, and 264C for the particular class. On the other hand, if the class proficiency measure has a second value that is more indicative of proficiency than is the first value, then the system can perform all of the adaptations of blocks 264A-F for the particular class. Put another way, different adaptations can have different class proficiency measure thresholds for performance. Moreover, the class proficiency measure threshold for a given adaptation can optionally vary amongst classes. For example, the adaptation of block 264A can be performed for a first class based on an associated class proficiency measure having a given value, but the adaptation of block 264A not performed for a second class based on an associated class proficiency measure having the same given value. This can be a result of the threshold for the second class being more stringent than is the threshold for the first class.

At block 264A, the system activates one or more capabilities that are specific to the class(es). The activated capabilities for a class can include previously inactive intent(s) and/or parameter(s) that are specific to the class. For example, an intent that enables renaming of smart devices via spoken input can be activated for a smart device control class. As another example, an intent that enables changing the color temperature of lights can be activated for a smart light control class. As yet another example, a parameter that specifies playback speed (e.g., 1.2× playback speed), for an already active intent that enables playing music, can be activated for a music playback class. As yet a further example, a parameter that specifies duration of a temperature adjustment (before reverting to the immediately prior temperature) can be activated for a thermostat control class. In these and other manners, where a class proficiency measure for a particular user and/or a particular device demonstrates proficiency with a particular class, additional capabilities within that class are enabled, providing more robust user control within the particular class. However, where the class proficiency measure does not demonstrate proficiency, the additional capabilities can remain dormant, thereby simplifying user control and/or preventing errant misinterpretation of user commands as being directed to the additional capabilities.

At block 264B, the system requires confirmation for any user requests that are not specific to the class(es) satisfying threshold(s). For any such user request, the system can first provide a prompt (e.g., visual and/or audible) that requests the user confirm their desire for the resulting action be performed, and only fulfill the user request if affirmative user interface input is received in response to the prompt. On the other hand, with the adaptation of block 264B, for any user request that is specific to the class(es) satisfying threshold(s), the system will not require confirmation.

As one particular example, assume class proficiency measures are generated for a particular device, and the class proficiency measure for a music playback class is the only class proficiency measure that satisfies a threshold. At block 264B, the system can require confirmation for any user request that is received at the particular device and interpreted, by the system (e.g., by an NLU engine), as not being for the music playback class. For instance, if a user request is received at the particular device and interpreted as a lighting control command, the system can cause an audible prompt of "are you sure you want to control the lights" to be rendered, and can only cause the lights to be controlled in response to an affirmative response (e.g., spoken input of "yes"). In these and other manners, for a particular device that is utilized overwhelmingly (or even exclusively) for music playback actions, any requests that are not of the music playback class can require user confirmation prior to fulfillment. Accordingly, errant fulfillment based on misinterpreted requests can be mitigated through performing the adaptation of block 264B on a particular user and/or a particular device level.

At block 264C, the system shortens clarification(s) and/or confirmation(s) for any requests that are specific to the class(es) satisfying threshold(s). Clarifications can be system generated prompts (e.g., audible and/or visual) that solicit user feedback in disambiguating between two or more possible interpretation(s) of intent(s) and/or parameter(s) determined based on user input. As one example, assume an assistant device is linked with two smart thermostats, one named "upstairs" and another named "downstairs". In response to a user utterance at the assistant device of "increase the thermostat two degrees", the system can generate and provide, via the assistant device, a clarification soliciting user feedback as to whether the increase should be applied to the "upstairs" thermostat, the "downstairs" thermostat, or both. If the adaptation of block 264C is not applied, the clarification can be an audible clarification of "do you want to adjust upstairs, downstairs, or both". On the other hand, if the adaptation of block 264C is applied, the clarification can be a shortened audible clarification of "which thermostat".

In these and other manners, where a class proficiency measure for a particular user and/or a particular device demonstrates proficiency with a particular class, clarifications can be shortened to provide a shortened user-assistant interaction and resulting conservation of device and/or network resources. However, where the class proficiency measure does not demonstrate proficiency, non-shortened clarifications can instead be provided, thereby providing more guidance and increasing the likelihood that further user input is correct clarifying input and does not instead lead to additional clarification(s) and/or failure of the user-assistant interaction. Accordingly, clarifications can be shortened for a class only when the proficiency measure indicates that more guidance is not needed for the class and doing so will provide a shortened user-assistant interaction.

Confirmations can be system generated notifications (e.g., audible and/or visual) that inform a corresponding user that a user request was successfully fulfilled by the assistant. For example, for a user request to increase the temperature of a thermostat by two degrees, and the adaptation of block 264C is not applied, a confirmation of "sure, thermostat temperature increased to seventy-five" can be provided in response to fulfillment of the user request. On the other hand, if the adaptation of block 264C is applied, the clarification can be a shortened audible clarification of "sure", an audible "ding" (or other sound), or no clarification provided at all. In these and other manners, where a class proficiency measure for a particular user and/or a particular device demonstrates proficiency with a particular class, confirmations can be shortened to provide a shortened user-assistant interaction and resulting conservation of device and/or network resources.

In some implementations, in shortening a confirmation or a clarification, the system generates a shortened version, of a standard confirmation or clarification, by utilization of one or more text summarization algorithms. In some other implementations, in shortening a confirmation or clarification, the system has access to a pre-stored shortened version of the clarification or confirmation, and the pre-stored shortened version is utilized by the system.

At block 264D, the system stores, on associated assistant device(s), model(s) and/or grammar(s) for the class(es) satisfying threshold(s). The associated assistant device(s) can each then locally utilize (i.e., utilizing processor(s) local to the assistant device) the model(s) and/or grammars. Such local utilization can reduce latency, prevent transmission of data to remote server(s) for processing, and/or can improve accuracy and/or breadth of local processing of user input(s). The model(s) can include machine learning model(s) such as those utilized in speech recognition, natural language processing, and/or fulfillment. The grammars can include those used in speech recognition and/or those used in natural language processing. The associated assistant device(s) on which the model(s) and/or grammar(s) are stored is the particular assistant device when the class proficiency measure is for the particular assistant device and include assistant device(s) linked with the particular user when the class proficiency measure is for the particular user. When the class proficiency measure is for the particular user and the particular device, the model(s) and/or grammar(s) can be stored on the particular device, but optionally only utilized when the particular user interacts with the particular device (e.g., as determined utilizing verification technique(s)).

As one example of block 264D, for a smart device control class having an associated proficiency measure that satisfies a threshold, NLU, and/or fulfillment models and/or grammar(s) that are specific to smart device control can be stored on associated assistant device(s). For instance, the NLU model(s) can be restricted to intents and/or parameters that are specific to smart device control. Also, for instance, the fulfillment model(s) can include those that enable generation of smart device control commands that can be sent over a local network to enable local control of smart device(s). Also for instance, the grammar(s) can include those utilized by local automatic speech recognition (e.g., a language model) and/or those utilized by local NLU (e.g., defining intents and/or parameters for those intents), and can be grammar(s) that are specific to smart device control.

At block 264E, the system purges, from associated assistant device(s), model(s) and/or grammar(s) that are not for the class(es) satisfying threshold(s). In some implementations, the system purges model(s) and/or grammar(s) for all class(es) that are not the class(es) satisfying threshold(s), based on those class(es) not satisfying the threshold(s). In some other implementations, only a subset of those class(es) not satisfying the threshold(s) are purged. The subset can be selected based on, for example, the proficiency measure(s) for those class(es) of the subset not satisfying a secondary threshold that indicates a minimal degree (or even no degree) of efficiency. Purging model(s) and/or grammar(s) at block 264E can delete them locally at the associated assistant device(s) or at least selectively prevent them from being loaded into memory, thereby freeing up memory and/or other storage resources of the associated assistant device(s). Further, it can enable the often resource-constrained (e.g., limited memory and/or other storage resources) associated assistant devices to have sufficient capacity for performing block 264D (described above) and/or can enable a greater quantity of model(s) and/or grammar(s) to be stored locally in performing block 264D. The model(s) that are purged can include machine learning model(s) such as those utilized in speech recognition, natural language processing, and/or fulfillment. The grammars can include those used in speech recognition and/or those used in natural language processing. The associated assistant device(s) from which the model(s) and/or grammar(s) are purged is the particular assistant device when the class proficiency measure is for the particular assistant device and include assistant device(s) linked with the particular user when the class proficiency measure is for the particular user. When the class proficiency measure is for the particular user and the particular device, the model(s) and/or grammar(s) can remain stored in read-only memory on the particular device, but optionally purged from memory and/or prevented being loaded into memory when the particular user interacts with the particular device (e.g., as determined utilizing verification technique(s)).

At block 264F, the system biases ASR and/or NLU toward those class(es) having proficiency measure(s) satisfying a threshold. Such biasing can improve accuracy of interpretation of user inputs, thereby mitigating occurrences of inaccurate interpretations that can prolong user-assistant interactions. The biasing can be for the particular assistant device and/or the particular user. In biasing ASR toward a class, recognition of a spoken utterance can be performed while biasing the recognition toward certain term(s) that are correlated with that class. For example, for a smart device control class, speech recognition of a spoken utterance can be biased toward terms that are correlated to smart device control such as term(s) mapped to smart device control intent(s) (e.g., "turn on", "turn off", "adjust", "change", "dim", etc.), name(s) of linked smart device(s) (e.g., "living room lights", "basement TV", etc.), and/or other correlated terms.

Biasing speech recognition toward certain term(s) can be accomplished utilizing one or more of various biasing techniques. As one example, a language model, utilized in some ASR techniques, can include weights for terms, where each of the weights reflect a corresponding degree of biasing for a corresponding term. As another example, biasing toward a term can be accomplished just by its inclusion in a language model utilized in ASR. As yet another example, a decoding graph, optionally utilized in ASR, can be decoded while biasing toward certain terms. As yet another example, biasing can be utilized to generate one or more additional hypotheses, that are in addition to an initial hypothesis (or initial hypotheses) generated by an ASR model, and those additional hypotheses considered as candidate transcriptions. For instance, an additional hypothesis can be generated and/or selected based on including biasing term(s). Additional and/or alternative ASR biasing approaches can be utilized.

In biasing NLU toward a class, generating a semantic representation of text (e.g., recognized text from ASR) can be biased toward semantic representations for that class. For example, which intent(s) and/or parameter(s) are determined for text can be dependent on the NLU biasing that is applied. For instance, when NLU biasing toward a smart device control class is applied, smart device control semantic representations are more likely to be generated. As one particular example, assume NLU is being performed on recognized text of "dim fifty percent" that was provided at an assistant device that has a dimmable display and that is also linked with smart light(s). If NLU is not being biased toward a smart device control class, NLU could result in a semantic representation that indicates that the dimmable display at the assistant device should be dimmed. On the other hand, if NLU is being biased toward a smart device control class, NLU could result in a semantic representation that indicates that the linked smart light(s) should be dimmed.

At block 264G, the system can cause notification(s) of the adaptation(s), of one or more of blocks 264A-F, to be rendered (e.g., audibly and/or visually). For example, when the adaptation is specific to the particular device, the notification(s) can be rendered at the particular device. Also, for example, when the adaptation is specific to the particular user, and to multiple assistant devices linked with the user, the notification(s) can be rendered at one or more of those multiple assistant devices. Also, for example, when the adaptation is specific to the particular device and to a particular user, the notification(s) can be rendered responsive to determining the particular user is interacting with, or is near, the particular device. User verification technique(s) can be utilized to determine that the particular user is interacting with the particular device. For some adaptation(s), block 264G can be performed after implementing the corresponding adaptation(s). For other adaptation(s), block 264G can be performed prior to implementing the corresponding adaptation(s). In some of those implementations, the corresponding adaptation(s) can only be activated responsive to receiving affirmative user interface input responsive to rendering the notification(s). For example, the notification for an adaptation can include a prompt to verify that the user desires the adaptation to be implemented and the corresponding adaptation implemented only if affirmative user input is received responsive to the prompt. In some implementations, the notification(s) can inform the user of the adaptation(s) and/or how they affect the user-assistant interaction and/or affect corresponding assistant device(s). For example, a notification of the adaptation of 264A can inform the user of the capabilities that were activated and/or examples of how those capabilities can be invoked through user input. In various implementations and/or for one or more adaptation(s), the adaptation(s) can be implemented without provision of any corresponding notification to the user.

Figure 2A:
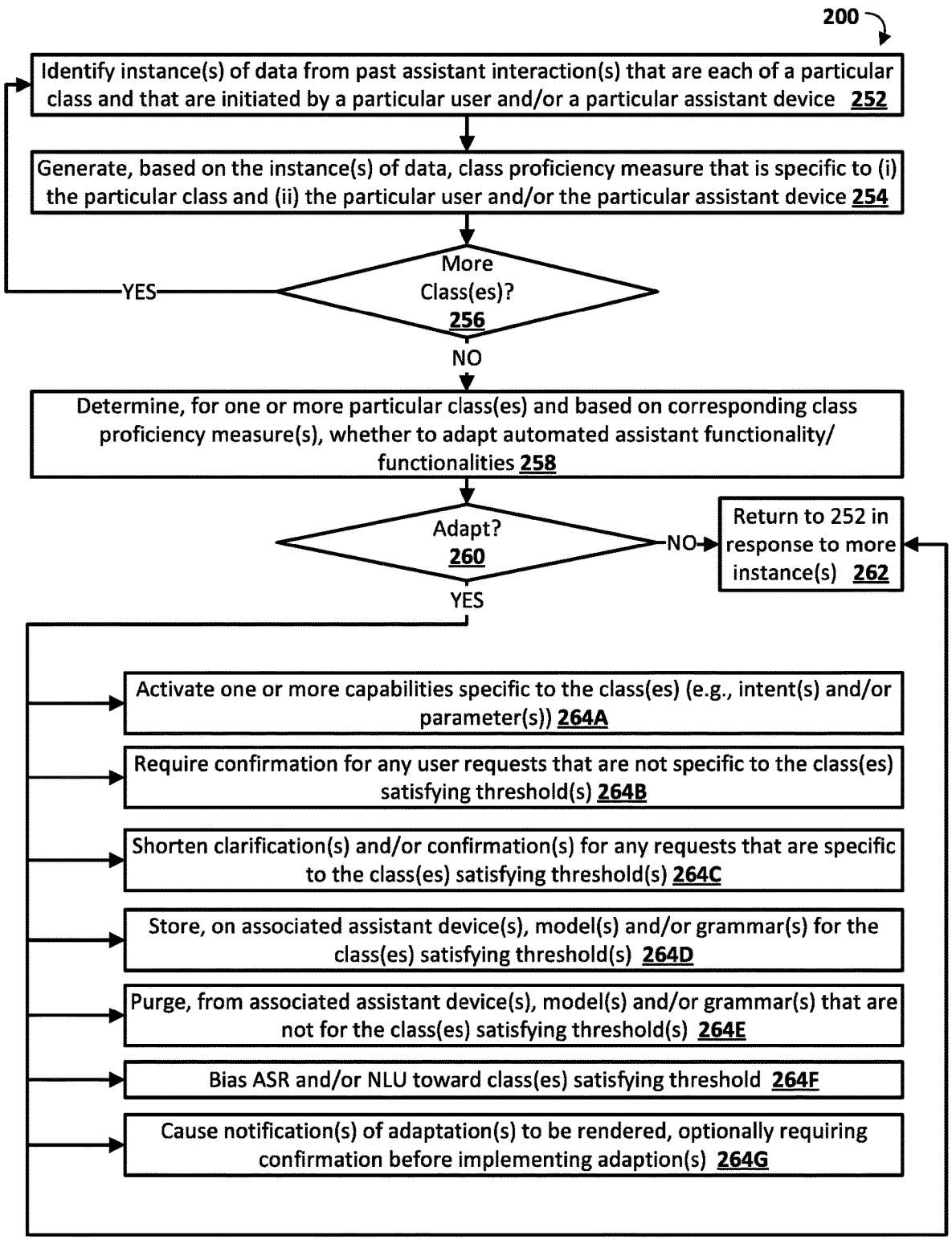
FIG. 2A is a flowchart illustrating an example method of generating class proficiency measure(s) and adapting automated assistant functionality based on the generated proficiency measure(s).
Figure 2B:
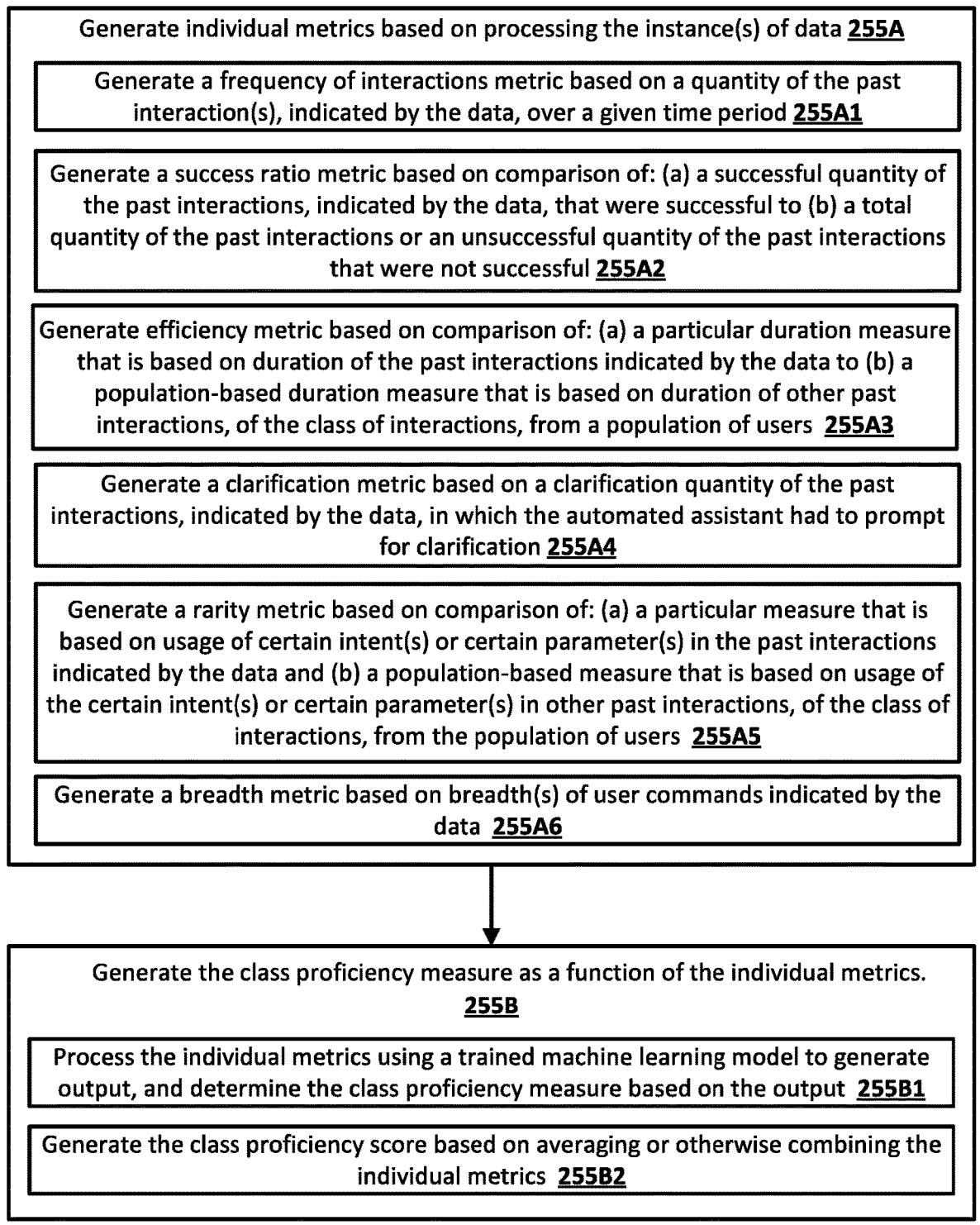
FIG. 2B is a flowchart illustrating a particular example of generating a class proficiency measure.

Turning now to FIG. 2B, a flowchart is provided that illustrates a particular example 254A of block 254 of FIG. 2A. At block 255A of the particular example 254A, the system generates individual metrics based on processing the instances of data. Block 255A can include one or more of blocks 255A1-255A6.

At block 255A1, the system generates a frequency of interactions metric, of the individual metric(s). The system can generate the frequency of interactions metric based on a quantity of the past interactions, indicated by the data, over a given time period. For example, the system can generate the frequency of interactions metric for a class as a function of assistant interactions, for that class, over the last week, over the last two weeks, over the last month, over the last three months, or over some other time period. For instance, the success ratio metric can be the quantity divided by the number of days in the time period, the number of weeks in the time period, or the number of hours in the time period. The quantity of past interactions, over the given time period, that are considered, can be a subset of past interactions of the class, such as a subset that includes only successful interactions. Frequency of interaction metrics that are indicative of a higher frequency of interaction can, in some implementations, be more indicative of proficiency for the class than are frequency of interaction metrics that are indicative of a lower frequency of interaction.

At block 255A2, the system generates a success ratio metric, of the individual metric(s). The system can generate the success ratio metric based on comparison of: (a) a successful quantity of the past interactions, indicated by the data, that were successful to (b) a total quantity of the past interactions or an unsuccessful quantity of the past interactions that were not successful. For example, assume the instances of data indicate one hundred past interactions of a smart device control class and that, of those, ninety-nine were successful and only one was unsuccessful. The system can generate the success ratio metric based on comparing (a) ninety-nine (successful quantity) to (b) one hundred (total quantity) or one (unsuccessful quantity). For instance, the success ratio metric can be based on dividing the successful quantity by the total quantity or dividing the successful quantity by the unsuccessful quantity. In some implementations, a successful interaction can be indicated by an instance of data when the corresponding assistant interaction resulted in fulfillment. For example, a smart device control interaction can be considered successful when a corresponding smart device control command is transmitted. In some implementations, an unsuccessful interaction can be indicated by an instance of data when the corresponding assistant interaction did not result in fulfillment. For example, if initial user input invoked an intent, but the user failed to specify all required parameter(s) for the intent (e.g., even after the assistant prompted for those), fulfillment cannot be performed and that interaction could be considered unsuccessful. As another example, if initial user input invoked an intent and included all required parameters, but the parameters were not valid for the interaction, that interaction could be considered unsuccessful. For instance, if the user provided a spoken utterance of "turn on the basement light", but had no linked smart lights with the alias "basement light", the parameter of "smart light to be controlled" would not be valid and, as a result, the interaction would fail. Success ratio metrics that are indicative of a higher ratio of success can, in some implementations, be more indicative of proficiency for the class than are success ratio metrics that are indicative of a lower ratio of success.

At block 255A3, the system generates an efficiency metric, of the individual metrics. The system can generate the efficiency metric based on comparison of: (a) a particular duration measure that is based on duration of the past interactions indicated by the data to (b) a population-based duration measure that is based on duration of other past interactions, of the class of interactions, from a population of users. For example, the particular duration measure can be an average duration of past interactions (for the particular user and/or particular device) for a class (optionally weighting more heavily toward more recent interactions), a mean duration of past interactions (for the particular user and/or particular device) for the class, or an average and standard deviation duration of past interactions (for the particular user and/or particular device) for the class, and/or other measure that is based on durations of past interactions for the class. The population-based duration measure can likewise be an average, a mean, an average and standard deviation, and/or other metric that is based on durations of past interactions. However, the past interactions considered in the population-based duration measure can be from a population of users that includes multiple users that are in addition to the particular user. For example, the population can include all users of the assistant or a subset of users of the assistant, such as a randomly selected subset, a subset that has agreed to certain terms, a subset in a particular geographic region, or other subset. By comparing the particular duration measure to the population-based measure in generating the efficiency metric, the efficiency metric reflects the efficiency of interactions initiated by the particular user and/or the particular device relative to a larger population. For example, it reflects whether those interactions are more efficient than, less efficient than, or of the same efficiency as the larger population. Efficiency metrics that are indicative of more efficiency than the larger population can, in some implementations, be more indicative of proficiency for the class than are efficiency metrics that are indicative of less efficiency than the larger population.

In some implementations, the efficiency metric can additionally or alternatively be based on comparison of: (a) a particular duration measure that is based on duration of the past interactions indicated by the data to (b) (i) an expected duration value that is hardcoded and/or (ii) an expected duration value that is also based on the data. As one example, the (a) particular duration measure that is based on duration of the past interactions indicated by the data can be based on the data that reflects a most recent quantity (e.g., 5, 10, or other integer) of past interactions of the particular user and/or of the particular device—and/or the past interactions that have occurred within a recent temporal window (e.g., within the last week or last two weeks). Continuing with the one example, the (b)(ii) expected duration value that is also based on the data can be based on the data that reflects one or more earlier in time past interactions of the particular user and/or of the particular device, such as the first N interactions initiated by the particular user and/or by the particular device. In such an example, the efficiency metric can indicate whether interactions for the class and initiated by the particular user and/or the particular device are becoming more efficient, less efficient, and/or not changing over time.

At block 255A4, the system generates a clarification metric, of the individual metrics. The system can generate the clarification metrics based on a clarification quantity of the past interactions, indicated by the data, in which the automated assistant had to prompt for clarification. For example, the system can generate the clarification metric as the quantity in which the automated assistant had to prompt for clarification. As another example, the system can generate the clarification metric based on comparing the raw quantity in which the automated assistant had to prompt for clarification, as compared to a total quantity of interactions (for the particular user and/or the particular device) for the class. As yet another example, the system can generate the clarification metric based on comparing the raw quantity in which the automated assistant had to prompt for clarification, as compared to a quantity of interactions (for the particular user and/or the particular device) for the class in which the automated assistant did not have to prompt for clarification. Clarification metrics that are indicative of a lesser quantity of clarifications can, in some implementations, be more indicative of proficiency for the class than are clarification metrics that are indicative of a greater quantity of clarifications.

At block 255A5, the system generates a rarity metric of the individual metrics. The system can generate the rarity metric based on comparison of: (a) a particular measure that is based on usage of certain intent(s) or certain parameter(s) in the past interactions indicated by the data and (b) a population-based measure that is based on usage of the certain intent(s) or certain parameter(s) in other past interactions, of the class of interactions, from the population of users. For example, the particular measure can be, for each of the intent(s) and/or measure(s), a corresponding quantity or frequency of utilization of the intent(s) and/or parameter(s) in past interactions (for the particular user and/or particular device) for the class. The population-based measure can be, for each of the intent(s) and/or measure(s), a corresponding average quantity or average frequency of utilization of the intent(s) and/or parameter(s), where the average is per user in a population of users that includes multiple users that are in addition to the particular user. For example, the population-based measure for an intent can be an average determined based on the total quantity of utilizations of the intent by all users in the population, divided by the number of users in the population. By comparing the particular measure to the population-based measure in generating the rarity metric, the rarity metric reflects rarity of the intent(s) and/or the parameter(s) in interaction initiated by the particular user and/or the particular device relative to a larger population. For example, it reflects whether those interactions utilize intent(s) and/or parameter(s) that are rare as compared to their utilization in a larger population. Rarity metrics that are indicative of utilization of rare intent(s) and/or rare parameter(s) (and/or that indicate a large quantity and/or high frequency of use of rare intent(s) and/or rare parameter(s)) can, in some implementations, be more indicative of proficiency for the class than are rarity metrics that are not indicative of utilization of rare intent(s) and/or rare parameter(s) (and/or that indicate a small quantity and/or low frequency of use of rare intent(s) and/or rare parameter(s).

At block 255A6, the system generates a breadth metric, of the individual metrics. The system can generate the breadth metric based on breadth(s) of user commands indicated by the data. For example, the breadth metric can be based on an average, median, or other function of individual breadth metrics that each quantify breadth of a corresponding user command. The breadth of a user command can be based on a quantity of parameters, for an intent specified by the user command, that are included in the user command. For example, an intent of playing music can include optional parameters of: artist name, song name, music service to utilize, which device(s) are to play the music, and music volume. A first user command of "play music" does not specify any of those optional parameters, a second user command of "play Hypothetical Artist on Hypothetical Music Service" specifies two of those optional parameters, and a third user command of "play, on kitchen assistant device, Hypothetical Song by Hypothetical Artist on volume 10" specifies four of those optional parameters. Accordingly, a first individual breadth metric for the first user command can be generated that is indicative of greater breadth than is a second individual breadth metric generated for the second user command. Likewise, a third individual breadth metric for the third user command can be generated that is indicative of less breadth than is the second individual breadth metric. As another example, an intent of dimming light(s) can include a mandatory parameter of an alias of the light(s) and an optional parameter of a dimming extent. A first user command that fails to specify the mandatory or optional parameter can have more breadth than a second user command that specifies the mandatory parameter but not the optional parameter, and the second user command can have more breadth than a third user command that specifies both the mandatory parameter and the optional parameter. Breadth metrics that are indicative of less breadth can, in some implementations, be more indicative of proficiency for the class than are breadth metrics that are indicative of more breadth.

At block 255B of the particular example 254A, the system generates the class proficiency measure as a function of one or more of the individual metrics.

In some implementations, block 255B includes block 255B1 in which the system processes the individual metrics, using a trained machine learning model, to generate output, and determines the class proficiency measure based on the output. The output can, for example, be a measure from 0 to 1 whose magnitude indicates a degree of proficiency (e.g., with 1 indicating the most proficiency and 0 indicating the least). Such a machine learning model can be trained utilizing training instances that each include individual metrics for a corresponding particular user and/or corresponding particular user device, and a supervised label that is a ground truth measure of proficiency for the particular user and/or particular user device. The ground truth label can be, for example, a measure from 0 to 1. In some implementations, the ground truth label can be generated based on user input, such as user input from the corresponding particular user in response to a prompt such as "how would you rate your proficiency in utilizing the automated assistant for [class]". For example, such a prompt can be presented with selectable options from 0 to 5 and a ground truth label assigned based on which of the options is selected from the user input. For instance, a measure of 0.0 for selection of 0, a measure of 0.2 for a selection of 1, a measure of 0.4 for a selection of 2, a measure of 0.6 for a selection of 3, a measure of 0.8 for a selection of 4, and a measure of 1.0 for a selection of 5. As another example, a quiz testing knowledge on various aspects of assistant commands for the class can be presented to the particular user and responses to that quiz can be utilized in generating the ground truth label. Additional and/or alternative techniques for generating supervised labels can be utilized.

In some implementations, block 255B additionally or alternatively includes block 255B2 in which the system generates the class proficiency score based on averaging or otherwise combining the individual metrics. For example, the class proficiency score can be based solely on block 255B2, or can be a function of both the output of block 255B1 and the averaging or otherwise combining of block 255B2. Optionally, in generating the class proficiency score based on averaging or otherwise combining the individual metrics, different individual metrics can be weighted differently and/or individual metrics can be normalized prior to averaging or otherwise combining. In some implementations, otherwise combining the individual metrics can be utilizing a heuristic to combine one or more of the metrics.

FIG. 2B illustrates multiple individual metrics being generated in block 255A and the class proficiency measure being generated, in block 255B, as a function of one or more of the individual metrics. However, in various implementations only a single one of the individual metrics is generated, and the class proficiency measure can be based on only the single one of the individual metrics. For example, the class proficiency measure can be the single one of the individual metrics or otherwise a function of the single one of the individual metrics.

Figure 3:
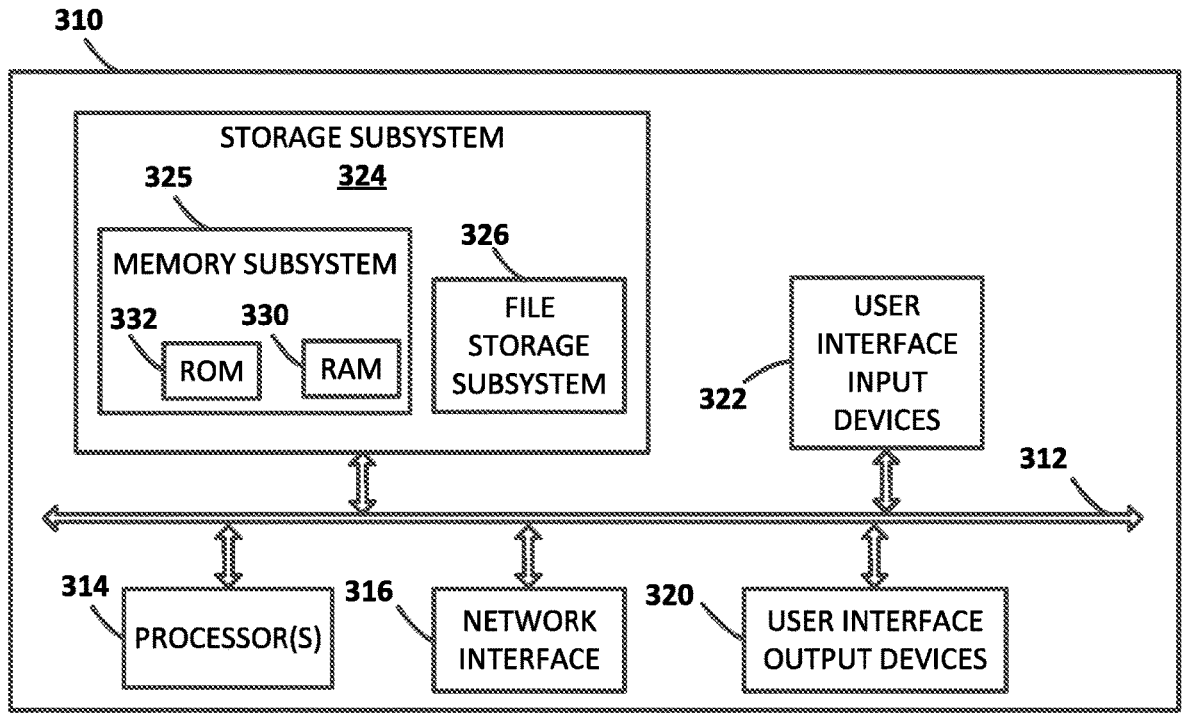
FIG. 3 illustrates an example architecture of a computing device.

FIG. 3 is a block diagram of an example computing device 310 that may optionally be utilized to perform one or more aspects of techniques described herein. In some implementations, one or more of a client computing device, and/or other component(s) may comprise one or more components of the example computing device 310.

Computing device 310 typically includes at least one processor 314 which communicates with a number of peripheral devices via bus subsystem 312. These peripheral devices may include a storage subsystem 324, including, for example, a memory subsystem 325 and a file storage subsystem 326, user interface output devices 320, user interface input devices 322, and a network interface subsystem 316. The input and output devices allow user interaction with computing device 310. Network interface subsystem 316 provides an interface to outside networks and is coupled to corresponding interface devices in other computing devices.

User interface input devices 322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 310 or onto a communication network.

User interface output devices 320 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 310 to the user or to another machine or computing device.

Storage subsystem 324 stores programming and data constructs that provide the functionality of some or all of the modules described herein. For example, the storage subsystem 324 may include the logic to perform selected aspects of one or more of the methods described herein, and/or to implement various components depicted herein.

These software modules are generally executed by processor 314 alone or in combination with other processors. Memory 325 used in the storage subsystem 324 can include a number of memories including a main random access memory ("RAM") 330 for storage of instructions and data during program execution and a read only memory ("ROM") 332 in which fixed instructions are stored. A file storage subsystem 326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 326 in the storage subsystem 324, or in other machines accessible by the processor(s) 314.

Bus subsystem 312 provides a mechanism for letting the various components and subsystems of computing device 310 communicate with each other as intended. Although bus subsystem 312 is shown schematically as a single bus, alternative implementations of the bus subsystem may use multiple busses.

Computing device 310 can be of varying types including a workstation, server, computing cluster, blade server, server farm, or any other data processing system or computing device. Due to the ever-changing nature of computers and networks, the description of computing device 310 depicted in FIG. 3 is intended only as a specific example for purposes of illustrating some implementations. Many other configurations of computing device 310 are possible having more or fewer components than the computing device depicted in FIG. 3.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes generating a class proficiency measure that is specific to a class of interactions with an automated assistant and that is specific to one or both of: (i) a particular user, and (ii) a particular assistant device. Generating the class proficiency measure includes processing instances of data for past assistant interactions, based on the past assistant interactions being of the class and being initiated by one or both of (i) the particular user and (ii) the particular assistant device. The method further includes determining that the class proficiency measure satisfies a threshold. The method further includes, in response to determining that the class proficiency measure satisfies the threshold: activating, for one or both of (i) the particular user and (ii) the particular assistant device, one or more capabilities specific to the class. The one or more capabilities are, prior to the activating, dormant for the particular user and the particular assistant device. In some implementations, the one or more capabilities specific to the class include a particular intent for the class of interactions and/or a particular parameter for an already activated intent for the class of interactions.

These and other implementations of the technology can include one or more of the following features.

In some implementations, the method further includes, in response to the activating or prior to the activating: causing a notification of the one or more capabilities to be proactively rendered at the particular assistant device or at an additional assistant device that is associated with the particular user. In some versions of those implementations, causing the notification to be proactively rendered occurs prior to the activating. In some of those versions, the activating is further in response to receiving affirmative user interface input responsive to the notification being rendered.

In some implementations, the activating includes mapping, in one or more computer readable media, the one or more capabilities to a user identifier of the particular user, a device identifier of the particular assistant device, or a combined identifier of the particular user and the particular assistant device. In some of those implementations, the mapping causes one or more additional models or one or more extended grammars to be utilized in assistant requests that include the user identifier, the device identifier, or the combined identifier.

In some implementations, the one or more capabilities specific to the class include the particular intent for the class of interactions.

In some implementations, the one or more capabilities specific to the class include the particular parameter for an already activated intent for the class of interactions.

In some implementations, processing the instances of data for past assistant interactions, based on the past assistant interactions being of the class and being initiated by one or both of (i) the particular user and (ii) the particular assistant device, includes: processing the instances of data to generate individual metrics for the class; and generating the class proficiency measure as a function of the individual metrics. In some versions of those implementations, generating the class proficiency measure as the function of the individual metrics includes processing the individual metrics utilizing a trained machine learning model to generate output, and determining the class proficiency measure based on the output. In some additional or alternative versions of those implementations, processing the instances of data to generate the individual metrics for the class includes one or more of: generating a frequency of interactions metric, of the individual metrics, based on a frequency quantity of the past interactions, indicated by the data, over a given time period; generating a success ratio metric, of the individual metrics, based on comparison of: a successful quantity of the past interactions, indicated by the data, that were successful to a total quantity of the past interactions indicated by the data or an unsuccessful quantity of the past interactions, indicated by the data, that were not successful; generating an efficiency metric, of the individual metrics, based on comparison of: a particular duration measure that is based on duration of the past interactions indicated by the data to a population-based duration measure that is based on duration of other past interactions, of the class of interactions, from a population of users; generating a clarification metric, of the individual metrics, based on a clarification quantity of the past interactions, indicated by the data, in which the automated assistant had to prompt for clarification; generating a rarity metric, of the individual metrics, based on comparison of: a particular measure that is based on usage of certain intents or certain parameters in the past interactions indicated by the data and a population-based measure that is based on usage of the certain intents or certain parameters in the other past interactions, of the class of interactions, from the population of users; or generating a breadth metric, of the individual metrics, based on breadths of user commands indicated by the data.

In some implementations, the proficiency measure is specific to both (i) the particular user and (ii) the particular assistant device. In those implementations, processing the instances of data for the past assistant interactions is based on the past assistant interactions being initiated by both (i) the particular user and (ii) the particular assistant device. Further, in those implementations the one or more capabilities are activated for both (i) the particular user and (ii) the particular assistant device.

In some implementations, a method implemented by one or more processors is provided and includes generating, for each of a plurality of disparate classes of interactions with an automated assistant, an associated class proficiency measure that is specific to one or both of: (i) a particular user, and (ii) a particular assistant device. Generating each of the associated class proficiency measures includes: processing corresponding instances of data for corresponding past assistant interactions, based on the corresponding past assistant interactions being for a corresponding one of the disparate classes of interactions and being initiated by one or both of (i) the particular user and (ii) the particular assistant device. The method further includes selecting, based on the associated class proficiency measures, one or more of the disparate classes of interactions for inclusion in a subset of classes of interactions. The method further includes assigning, in one or more computer readable media, one or both of (i) the particular user and (ii) the particular assistant device in association with the selected subset of classes of interactions. The method further includes, subsequent to the assigning, processing audio data that is detected via one or more microphones of the particular assistant device and that captures a spoken utterance of the particular user and determining, based on the processing, that the spoken utterance is directed to a particular class of interactions. The method further includes, based on the spoken utterance being provided by the particular user and/or being detected via the microphones of the particular client device, determining whether the particular class of interactions is included in the selected subset of classes of interactions. The method further includes, when it is determined that the particular class of interactions is not included in the selected subset of classes of interactions: prompting the particular user for verification prior to fulfilling the spoken utterance and fulfilling the spoken utterance only when affirmative user interface input is received responsive to the prompting.

These and other implementations of the technology disclosed herein can include one or more of the following features.

In some implementations, the method further includes, in response to the selecting, causing a notification to be proactively rendered at the particular assistant device or at an additional assistant device that is associated with the particular user. The notification can indicate that assistant interactions that fall outside of the selected particular class of interactions will require additional confirmation from the user prior to fulfillment. In some of those implementations, causing the notification to be proactively rendered occurs prior to the assigning, and the assigning is further in response to receiving affirmative user interface input responsive to the notification being rendered.

In some implementations, processing instances of data for past assistant interactions, based on the past assistant interactions being of the class and being initiated by one or both of (i) the particular user and (ii) the particular assistant device, includes: processing the instances of data to generate individual metrics for the class and generating the class proficiency measure as a function of the individual metrics. In some of those implementations, processing the instances of data to generate the individual metrics for the class includes one or more of: generating a success ratio metric, of the individual metrics, based on comparison of: a successful quantity of the past interactions, indicated by the data, that were successful to a total quantity of the past interactions indicated by the data or an unsuccessful quantity of the past interactions, indicated by the data, that were not successful; generating an efficiency metric, of the individual metrics, based on comparison of: a particular duration measure that is based on duration of the past interactions indicated by the data to a population-based duration measure that is based on duration of other past interactions, of the class of interactions, from a population of users; or generating a clarification metric, of the individual metrics, based on a clarification quantity of the past interactions, indicated by the data, in which the automated assistant had to prompt for clarification.

In some implementations, the proficiency measure is specific to both (i) the particular user, and (ii) the particular assistant device. In those implementations, assigning the one or both of (i) the particular user and (ii) the particular assistant device in association with the selected subset of classes of interactions is assigning both the particular user and the particular assistant device in association with the selected subset of classes of interactions, and determining whether the particular class of interactions is included in the selected subset of classes of interactions is based on the spoken utterance being provided by the particular user being detected via the microphones of the particular client device.

In some implementations, a method implemented by one or more processors is provided and includes generating, for each of a plurality of disparate classes of interactions with an automated assistant, an associated class proficiency measure that is specific to a particular assistant device. Generating each of the associated class proficiency measures includes processing corresponding instances of data for corresponding past assistant interactions, based on the corresponding past assistant interactions being for a corresponding one of the disparate classes of interactions and being initiated by the particular assistant device. The method further includes selecting a first set of one or more of the disparate classes of interactions for inclusion in a subset of classes of interactions based on their associated class proficiency measures satisfying a threshold. The method further includes, in response to selecting the first set, performing one or both of: (a) causing the particular assistant device to purge, from on-device storage of the particular assistant device, one or more machine learning models or grammars that are specific to any of the disparate classes of interactions not included in the first set, and (b) causing the particular assistant device to download and store, in the on-device storage, one or more other machine learning models or other grammars that are specific to at least some of the one or more disparate classes of interactions included in the subset.

In some implementations, a method implemented by one or more processors is provided and includes generating a class proficiency measure that is specific to a class of interactions with an automated assistant and that is specific to one or both of: (i) a particular user, and (ii) a particular assistant device. Generating the class proficiency measure includes processing instances of data for past assistant interactions to generate individual metrics for the class. Processing the instances of data for the past assistant interactions is based on the past assistant interactions being of the class and being initiated by one or both of (i) the particular user and (ii) the particular assistant device. The method further includes generating the class proficiency measure as a function of the individual metrics. The method further includes assigning, in one or more computer readable media, one or both of (i) the particular user and (ii) the particular assistant device in association with the selected subset of classes of interactions. The method further includes, subsequent to the assigning: processing audio data that is detected via one or more microphones of the particular assistant device and that captures a spoken utterance of the particular user; determining, based on the processing, that the spoken utterance is directed to the class of interactions; and in response to the spoken utterance being directed to the class of interactions, performing one or both of: providing a shortened response to the spoken utterance in lieu of a longer response, and bypassing providing a confirmation message before fulfilling a request embodied in the spoken utterance.

In addition, some implementations may include a system including one or more assistant devices, each with one or more processors and memory operably coupled with the one or more processors, where the memory(ies) of the one or more assistant devices store instructions that, in response to execution of the instructions by the one or more processors of the one or more assistant devices, cause the one or more processors to perform any of the methods described herein. Some implementations also include at least one non-transitory computer-readable medium including instructions that, in response to execution of the instructions by one or more processors, cause the one or more processors to perform any of the methods described herein.

What is claimed is:

1. A method implemented by one or more processors, the method comprising:
   generating a class proficiency measure that is specific to a class of interactions with an automated assistant and that is specific to a particular user, wherein generating the class proficiency measure comprises:
   processing instances of data for past assistant interactions, based on the past assistant interactions being of the class and being initiated by the particular user; determining that the class proficiency measure satisfies a threshold; in response to determining that the class proficiency measure satisfies the threshold:
   activating, for the particular user, one or more capabilities specific to the class, wherein the one or more capabilities are, prior to the activating, dormant for the particular user and the particular assistant device, wherein the one or more capabilities specific to the class comprise one or both of:
   a particular intent for the class of interactions,
   and a particular parameter for an already activated intent for the class of interactions;
   in response to determining that the class proficiency measure fails to satisfy the threshold:
   maintaining the one or more capabilities as dormant for the particular user.

2. The method of claim 1, further comprising, in response to the activating or prior to the activating: causing a notification of the one or more capabilities to be proactively rendered at an assistant device that is associated with the particular user.

3. The method of claim 2, wherein causing the notification to be proactively rendered occurs prior to the activating, and wherein the activating is further in response to receiving affirmative user interface input responsive to the notification being rendered.

4. The method of claim 1, wherein the activating comprises:
   mapping, in one or more computer readable media, the one or more capabilities to a user identifier of the particular user.

5. The method of claim 4, wherein the mapping causes one or more additional models or one or more extended grammars to be utilized in assistant requests that include the user identifier.

6. The method of claim 1, wherein the one or more capabilities specific to the class comprise the particular intent for the class of interactions.

7. The method of claim 1, wherein the one or more capabilities specific to the class comprise the particular parameter for an already activated intent for the class of interactions.

8. The method of claim 1, wherein processing the instances of data for past assistant interactions, based on the past assistant interactions being of the class and being initiated by the particular user and comprises: processing the instances of data to generate individual metrics for the class; and generating the class proficiency measure as a function of the individual metrics.

9. The method of claim 8, wherein generating the class proficiency measure as the function of the individual metrics comprises processing the individual metrics utilizing a trained machine learning model to generate output, and determining the class proficiency measure based on the output.

10. The method of claim 8, wherein processing the instances of data to generate the individual metrics for the class comprises two or more of:
    generating a frequency of interactions metric, of the individual metrics, based on a frequency quantity of the past interactions, indicated by the data, over a given time period; generating a success ratio metric, of the individual metrics, based on comparison of: a successful quantity of the past interactions, indicated by the data, that were successful to a total quantity of the past interactions indicated by the data or an unsuccessful quantity of the past interactions, indicated by the data, that were not successful; generating an efficiency metric, of the individual metrics, based on comparison of: a particular duration measure that is based on duration of the past interactions indicated by the data to a population-based duration measure that is based on duration of other past interactions, of the class of interactions, from a population of users; generating a clarification metric, of the individual metrics, based on a clarification quantity of the past interactions, indicated by the data, in which the automated assistant had to prompt for clarification; generating a rarity metric, of the individual metrics, based on comparison of: a particular measure that is based on usage of certain intents or certain parameters in the past interactions indicated by the data and a population-based measure that is based on usage of the certain intents or certain parameters in the other past interactions, of the class of interactions, from the population of users; or generating a breadth metric, of the individual metrics, based on breadths of user commands indicated by the data.

11. A method implemented by one or more processors, the method comprising:

generating, for each of a plurality of disparate classes of interactions with an automated assistant, an associated class proficiency measure that is specific to a particular user, wherein generating the associated class proficiency measures comprises:

processing corresponding instances of data for corresponding past assistant interactions, based on the corresponding past assistant interactions being for a corresponding one of the disparate classes of interactions and being initiated by the particular user; selecting, based on the associated class proficiency measures, one or more of the disparate classes of interactions for inclusion in a subset of classes of interactions; assigning, in one or more computer readable media the particular user in association with the selected subset of classes of interactions; subsequent to the assigning:

processing audio data that is detected via one or more microphones of the particular assistant device and that captures a spoken utterance of the particular user; determining, based on the processing, that the spoken utterance is directed to a particular class of interactions; based on the spoken utterance being provided by the particular user and/or being detected via the microphones of the particular client device, determining whether the particular class of interactions is included in the selected subset of classes of interactions; when it is determined that the particular class of interactions is not included in the selected subset of classes of interactions:

prompting the particular user for verification prior to fulfilling the spoken utterance; and fulfilling the spoken utterance only when affirmative user interface input is received responsive to the prompting.

12. The method of claim 11, further comprising, in response to the selecting: causing a notification to be proactively rendered at an assistant device that is associated with the particular user, wherein the notification indicates that assistant interactions that fall outside of the selected particular class of interactions will require additional confirmation from the user prior to fulfillment.

13. The method of claim 12, wherein causing the notification to be proactively rendered occurs prior to the assigning, and wherein the assigning is further in response to receiving affirmative user interface input responsive to the notification being rendered.

14. The method of claim 11, wherein processing instances of data for past assistant interactions, based on the past assistant interactions being of the class and being initiated by the particular user comprises:

processing the instances of data to generate individual metrics for the class; and generating the associated class proficiency measure as a function of the individual metrics.

15. The method of claim 14, wherein processing the instances of data to generate the individual metrics for the class comprises two or more of: generating a success ratio metric, of the individual metrics, based on comparison of: a successful quantity of the past interactions, indicated by the data, that were successful to a total quantity of the past interactions indicated by the data or an unsuccessful quantity of the past interactions, indicated by the data, that were not successful; generating an efficiency metric, of the individual metrics, based on comparison of: a particular duration measure that is based on duration of the past interactions indicated by the data to a population-based duration measure that is based on duration of other past interactions, of the class of interactions, from a population of users; or generating a clarification metric, of the individual metrics, based on a clarification quantity of the past interactions, indicated by the data, in which the automated assistant had to prompt for clarification.

* * * * *